Patented May 10, 1932

1,857,557

UNITED STATES PATENT OFFICE

JULIUS LAUX, OF UERDINGEN-ON-THE-RHINE, GERMANY, ASSIGNOR TO I. G. FARBEN-INDUSTRIE AKTIENGESELLSCHAFT, OF FRANKFORT-ON-THE-MAIN, GERMANY, A CORPORATION OF GERMANY

PRODUCTION OF IRON OXIDE PIGMENTS

No Drawing. Application filed February 4, 1928, Serial No. 252,041, and in Germany February 15, 1927.

The present invention relates to processes for the production of iron oxide pigments; more specifically it relates to a process in which finely divided iron hydroxides are obtained as by-products from the reduction of aromatic nitro compounds by means of iron and acids or acid reacting salts. The invention also embraces the new products.

In the methods of producing aromatic amines heretofore known and used for a long time involving the use of iron and an amount of acid insufficient to dissolve the same, the iron which is used as the reducing agent generally changes into a brown-black oxide whose composition corresponds to a formula lying between $Fe_3O_4$ and $Fe_2O_3$. This oxide is not useful as a color pigment and is of very inferior quality on account of its low coloring power.

As set forth in my U. S. Patents 1,774,930; 1,774,931 and 1,774,932 and in my co-pending application, Serial No. 252,040, filed February 4, 1928, finely divided iron oxides or iron hydroxides of high commercial value are obtained by carrying out the reduction in the presence of an aqueous solution of a salt of a trivalent or tetravalent metal.

I have found further that this process of obtaining iron oxide pigments as by-products from the reduction of aromatic nitro compounds to the corresponding amines is not restricted to the use of aqueous solutions of salts but that suspensions of hydroxides, oxides or slightly soluble basic salts of trivalent or tetravalent metals in a finely divided state substantially give the same results.

According to the present invention the reduction of aromatic nitro compounds with iron metal is carried out in the presence of a suspension of a hydroxide, oxide or slightly soluble basic salt of a trivalent or tetravalent metal. It is to be understood that the state of a most fine up to colloidal division is of a very favorable effect as to the iron hydroxide formed and that especially the above-mentioned compounds of aluminium, iron, cerium, thorium, lanthanium, didymium and other rare earth metals such as aluminium hydroxide, aluminium oxide, basic aluminium sulfate, basic aluminium silicate, ferric hydroxide, ferric oxide, cerium hydroxide, cerium oxide, cerium dioxide, thorium hydroxide, thorium oxide, basic thorium carbonate, lanthanium hydroxide, lanthanium oxide, didymium hydroxide, didymium oxide, samarium hydroxide, samarium oxide, europium hydroxide, europium oxide, gadolinium hydroxide, gadolinium oxide, terbium hydroxide, terbium oxide, dysprosium hydroxide, dysprosium oxide, holmium hydroxide, holmium oxide, erbium hydroxide, erbium oxide, thulium hydroxide, thulium oxide, yttrium hydroxide, yttrium oxide, ytterbium hydroxide, ytterbium oxide, scandium hydroxide, scandium oxide, lutetium hydroxide, lutetium oxide, titanium dioxide and their mixtures have been found most efficacious.

The hydroxides, oxides or basic salts employed in the reduction of aromatic nitro compounds may be added to the reaction mixture in a ready-made state but preferably they are formed from soluble salts by the addition of a basic substance, such as a hydroxide of the alkaline and alkaline earth metals, carbonates or organic bases to their solution.

If the reduction is carried out in this manner in the presence of a preferably finely divided hydroxide, oxide or slightly soluble basic salt of a trivalent or tetravalent metal (the process not essentially departing in other respects from the customary processes, as will be evidenced by the examples hereinafter set forth) there remains after the separating of the aromatic amine, for example aniline, a slurry which contains the oxidized iron as a finely divided yellowish-brown to brown-violet hydroxide of the trivalent iron oxide $Fe_2O_3$. After levigation, washing out and drying this hydroxide is useful as a color pigment either directly or, if red shades are desired, after being subjected to a preliminary calcination.

The process is illustrated by the following examples. It is to be understood, however, that the process according to the present invention is capable of being carried out with other nitro compounds than those mentioned in the examples, for example, with hydroxy-, chloro- and aminonitro compounds, polynitro compounds and nitro-sulfonic acids.

Other acids than hydrochloric acid may be combined with the substance which forms an acid reacting salt yielding the acid necessary to carry out the reduction of the aromatic nitro compound and in addition to the suspended compounds soluble salts may be present in the reaction mixture.

1. Aluminium is precipitated from a solution of 40 kgs. of aluminium sulfate in 300 litres of water by means of the calculated amount of a soda solution to form highly basic insoluble aluminium sulfate in a finely divided state. This mixture is admitted to 200 kgs. of ground iron, without separating the solution from the precipitate; then a concentrated aqueous solution of 60 kgs. of aniline hydrochloride is added and 200 kgs. of nitrobenzene are allowed to run at 100° C. into the agitated mixture as usual in processes for reducing aromatic nitro compounds. After separating the formed aniline, there remains a yellowish-brown slurry consisting of an iron hydroxide having an average content of 13 per cent of chemically combined water. By calcination it is converted into a brilliant red iron oxide.

2. A finely divided cerium hydroxide is precipitated while stirring a solution of 10 kgs. of cerium chloride in 150 litres of water, by means of 40 kgs. of aniline. 200 kgs. of nitrobenzene are added to this mixture and are reduced in the well known manner by gradually adding 200 kgs. of iron. The resulting residue is an iron hydroxide of a brown-red color having an average content of 8 per cent of chemically combined water.

3. 40 kgs. of ferric chloride dissolved in 160 litres of water are precipitated by means of 26 kgs. of powdered chalk and added to 200 kgs. of nitrobenzene, which are then reduced by means of 225 kgs. of iron as shown in Example 2. The resulting iron hydroxide is of a red violet color and has an average content of 5.2 per cent of chemically combined water.

I claim:

1. In the process of reducing an aromatic nitro compound involving the treatment with iron and an aqueous solution of a salt insufficient in amount to dissolve the iron, to the production of the corresponding amine and an iron oxide sludge, the steps of improving the pigmenting properties of said iron oxide sludge which consist in starting and carrying out the reduction in the presence of an aqueous suspension of a sparingly soluble basic compound of a trivalent metal, separating the iron oxide sludge from the resulting amino compound and purifying the former by levigation and washing out.

2. In the process of reducing an aromatic nitro compound involving the treatment with iron and an aqueous solution of a salt insufficient in amount to dissolve the iron, to the production of the corresponding amine and an iron oxide sludge, the steps of improving the pigmenting properties of said iron oxide sludge which consist in starting and carrying out the reduction in the presence of an aqueous suspension of a sparingly soluble basic compound of a trivalent metal, separating the iron oxide sludge from the resulting amino compound, purifying the former by levigation and washing out and drying and calcining the resulting product.

3. In the process of reducing an aromatic nitro compound involving the treatment with iron and an aqueous solution of a salt acid-reacting due to hydrolysis and insufficient in amount to dissolve the iron, to the production of the corresponding amine and an iron oxide sludge, the steps of improving the pigmenting properties of said iron oxide sludge which consist in starting and carrying out the reduction in the presence of an aqueous suspension of a sparingly soluble basic compound of a trivalent metal, separating the iron oxide sludge from the resulting amino compound and purifying the former by levigation and washing out.

4. In the process of reducing an aromatic nitro compound involving the treatment with iron and an aqueous solution of a salt acid-reacting due to hydrolysis and insufficient in amount to dissolve the iron, to the production of the corresponding amine and an iron oxide sludge, the steps of improving the pigmenting properties of said iron oxide sludge which consist in starting and carrying out the reduction in the presence of an aqueous suspension of a sparingly soluble basic compound of a trivalent metal, separating the iron oxide sludge from the resulting amino compound, purifying the former by levigation and washing out and drying and calcining the resulting product.

5. In the process of reducing an aromatic nitro compound involving the treatment with iron and an aqueous solution acid-reacting due to hydrolysis and insufficient in amount to dissolve the iron, to the production of the corresponding amine and an iron oxide sludge, the steps of improving the pigmenting properties of said iron oxide sludge which consist in starting and carrying out the reduction in the presence of an aqueous suspension of a finely divided sparingly soluble basic compound of a trivalent metal, separating the iron oxide sludge from the resulting amino compound and purifying the former by levigation and washing out.

6. In the process of reducing an aromatic nitro compound involving the treatment with iron and an aqueous solution acid-reacting due to hydrolysis and insufficient in amount to dissolve the iron, to the production of the corresponding amine and an iron oxide sludge, the steps of improving the pigmenting properties of said iron oxide sludge which consist in starting and carrying out the reduction in the presence of an aqueous suspension of a basic aluminum compound separating the iron oxide sludge from the resulting amino compound and purifying the former by levigation and washing out.

7. In the process of reducing an aromatic nitro compound involving the treatment with iron and an aqueous solution acid reacting due to hydrolysis and insufficient in amount to dissolve the iron, to the production of the corresponding amine and an iron oxide sludge, the steps of improving the pigmenting properties of said iron sludge which consist in starting and carrying out the reduction in the presence of an aqueous suspension of a basic aluminum compound which is precipitated by an aromatic amine from a soluble aluminum salt, separating the iron oxide sludge from the resulting amino compound and purifying the former by levigation and washing out.

In testimony whereof I have hereunto set my hand.

JULIUS LAUX.